United States Patent
Trimble et al.

(10) Patent No.: US 11,544,114 B1
(45) Date of Patent: Jan. 3, 2023

(54) METHODS FOR OPTIMIZING CLOUD-SCALE DISTRIBUTED ASYNCHRONOUS SYSTEMS WITH IDEMPOTENT WORKLOADS AND DEVICES THEREOF

(71) Applicant: F5 Networks, Inc., Seattle, WA (US)

(72) Inventors: Patrick Trimble, Seattle, WA (US); Michael Bellhart, Seattle, WA (US)

(73) Assignee: F5, Inc., Seattle, WA (US)

( * ) Notice: Subject to any disclaimer, the term of this patent is extended or adjusted under 35 U.S.C. 154(b) by 292 days.

(21) Appl. No.: 16/880,700

(22) Filed: May 21, 2020

Related U.S. Application Data (60) Provisional application No. 62/852,866, filed on May 24, 2019.

(51) Int. Cl.
| | | |
|---|---|---|
| *H04L 9/40* | (2022.01) | |
| *G06F 9/50* | (2006.01) | |
| *G06F 9/48* | (2006.01) | |
| *H04L 41/0813* | (2022.01) | |
| *H04L 41/14* | (2022.01) | |

(52) U.S. Cl.
CPC .......... *G06F 9/5038* (2013.01); *G06F 9/4881* (2013.01); *H04L 41/0813* (2013.01); *H04L 41/14* (2013.01); *H04L 63/205* (2013.01)

(58) Field of Classification Search
CPC .................................................. G06F 9/5038
See application file for complete search history.

(56) References Cited

U.S. PATENT DOCUMENTS

| | | | | |
|---|---|---|---|---|
| 9,292,371 | B1* | 3/2016 | Clifford | G06F 11/0709 |
| 10,580,090 | B2* | 3/2020 | Shah | G06Q 50/01 |
| 2005/0144189 | A1* | 6/2005 | Edwards | G06F 16/185 |
| | | | | 707/999.102 |
| 2013/0097426 | A1* | 4/2013 | Agrawal | G06F 3/0484 |
| | | | | 713/176 |
| 2013/0312006 | A1* | 11/2013 | Hardman | G06F 9/5044 |
| | | | | 718/105 |
| 2014/0196044 | A1* | 7/2014 | Fernando | G06F 9/5072 |
| | | | | 718/102 |
| 2016/0057076 | A1* | 2/2016 | Zlati | G06F 9/485 |
| | | | | 709/201 |
| 2019/0050245 | A1* | 2/2019 | Bhageria | G06F 9/5072 |
| 2020/0159587 | A1* | 5/2020 | Li | G06F 9/4881 |

(Continued)

*Primary Examiner* — Fahmida S Chowdhury
(74) *Attorney, Agent, or Firm* — Troutman Pepper Hamilton Sanders LLP (Rochester)

(57) ABSTRACT

Methods, non-transitory computer readable media, workload management devices, and network traffic management systems that optimize systems with idempotent workloads are illustrated. With this technology, an identification is made when a status indicates a jobs is deferred. A determination is then made when the job is preempted based on a type of the job, when the identification indicates the job is deferred and the type and an identifier of the job matches another job. Another status is adjusted to indicate the other job is deferred. The status is then modified to indicate that the job is preempted, or the job is removed, when the determination indicates the job is preempted. Accordingly, jobs are selectively preempted, such as based on idempotency of the associated workload, to achieve intended consistent states for objects faster, with increased reliability, and with reduced overhead.

20 Claims, 6 Drawing Sheets

(56) References Cited

U.S. PATENT DOCUMENTS

| | | | |
|---|---|---|---|
| 2020/0192899 A1* | 6/2020 | Joshi | G06F 16/24552 |
| 2020/0342389 A1* | 10/2020 | Merg | G06Q 10/063112 |
| 2020/0364082 A1* | 11/2020 | Pokkuluri | G06F 9/5038 |
| 2021/0165776 A1* | 6/2021 | Nejad | G06F 9/4843 |

* cited by examiner

METHODS FOR OPTIMIZING CLOUD-SCALE DISTRIBUTED ASYNCHRONOUS SYSTEMS WITH IDEMPOTENT WORKLOADS AND DEVICES THEREOF

This application claims the benefit of U.S. Provisional Patent Application Ser. No. 62/852,866, filed May 24, 2019, which is hereby incorporated by reference in its entirety.

FIELD

This technology generally relates to workload management and, more particularly, to methods and devices for optimizing distributed asynchronous network systems with idempotent workloads.

BACKGROUND

In many systems, the time required to process received jobs is large relative to the time required to issue the jobs. Such an asymmetry exists with respect to network security apparatuses that protect applications hosted by servers from network threats. The network security apparatuses can be deployed in a cloud, and can host proxy services that analyze network traffic originating from clients according to security policies. As a result of the analysis, the network security apparatuses perform any number of network security functions (e.g., generate alerts and/or allow or block the network traffic).

A network security apparatus can host a relatively large number of proxy services that analyze the network traffic based on the security policies, mitigate network threats, and steer benign network traffic to an appropriate destination (e.g., a server hosting an application). In such deployments, administrators generally maintain the security policies by submitting jobs in the form of configuration updates. Many of the submitted jobs are idempotent and any number of the jobs can be applicable to a relatively large number of the security policies and/or proxy services.

Updating the infrastructure as part of executing such jobs issued at a high rate in cloud-scale, distributed, and asynchronous systems, such as network security apparatuses, can require significant resource utilization, which can lead to device failure, and/or can result in significant delay with respect to the execution of the jobs and eventual consistency of the systems. To control overhead and reduce device failure, the rate at which jobs can be submitted by administrator(s) has been limited. However, rate-limiting the issuance of jobs degrades the experience for administrators and can introduce additional delay, which is undesirable.

SUMMARY

A method for workload processing is disclosed that is implemented by a network traffic management system, including one or more network security apparatuses, workload management devices, server devices, or client devices. The method includes identifying when a status associated with one of a plurality of jobs indicates that the one of the plurality of jobs is deferred, wherein the one of the plurality of jobs comprises a type corresponding with an idempotent workload. A determination is made when the one of the plurality of jobs is preempted based on the type, when the identification indicates that the one of the plurality of jobs is deferred and the type and an identifier of the one of the plurality of jobs matches another one of the plurality of jobs. Another status is adjusted to indicate that the another one of the plurality of jobs is deferred, and the status is modified to indicate the one of the plurality of jobs is preempted or the one of the plurality of jobs is removed, when the determination indicates that the one of the plurality of jobs is preempted.

A workload management device is disclosed that includes memory including programmed instructions stored thereon and one or more processors configured to be capable of executing the stored programmed instructions to identify when a status associated with one of a plurality of jobs indicates that the one of the plurality of jobs is deferred, wherein the one of the plurality of jobs comprises a type corresponding with an idempotent workload. A determination is made when the one of the plurality of jobs is preempted based on the type, when the identification indicates that the one of the plurality of jobs is deferred and the type and an identifier of the one of the plurality of jobs matches another one of the plurality of jobs. Another status is adjusted to indicate that the another one of the plurality of jobs is deferred, and the status is modified to indicate the one of the plurality of jobs is preempted or the one of the plurality of jobs is removed, when the determination indicates that the one of the plurality of jobs is preempted.

A non-transitory computer readable medium is disclosed that has stored thereon instructions for workload processing and includes executable code that, when executed by one or more processors, causes the one or more processors to identify when a status associated with one of a plurality of jobs indicates that the one of the plurality of jobs is deferred, wherein the one of the plurality of jobs comprises a type corresponding with an idempotent workload. A determination is made when the one of the plurality of jobs is preempted based on the type, when the identification indicates that the one of the plurality of jobs is deferred and the type and an identifier of the one of the plurality of jobs matches another one of the plurality of jobs. Another status is adjusted to indicate that the another one of the plurality of jobs is deferred, and the status is modified to indicate the one of the plurality of jobs is preempted or the one of the plurality of jobs is removed, when the determination indicates that the one of the plurality of jobs is preempted.

A network traffic management system is disclosed that includes one or more network security apparatuses, workload management devices, server devices, or client devices with memory including programmed instructions stored thereon and one or more processors configured to be capable of executing the stored programmed instructions to identify when a status associated with one of a plurality of jobs indicates that the one of the plurality of jobs is deferred, wherein the one of the plurality of jobs comprises a type corresponding with an idempotent workload. A determination is made when the one of the plurality of jobs is preempted based on the type, when the identification indicates that the one of the plurality of jobs is deferred and the type and an identifier of the one of the plurality of jobs matches another one of the plurality of jobs. Another status is adjusted to indicate that the another one of the plurality of jobs is deferred, and the status is modified to indicate the one of the plurality of jobs is preempted or the one of the plurality of jobs is removed, when the determination indicates that the one of the plurality of jobs is preempted.

This technology has a number of associated advantages including methods, non-transitory computer readable media, workload management devices, and network traffic management systems that process jobs associated with idempotent workloads with reduced overhead and increased reliability.

Idempotent jobs are filtered, stored as deferred jobs when a job of the same type is executing for a same managed object, and selectively preempted when subsequent jobs of the same type and associated with the same managed object are received. Accordingly, resources are advantageously not utilized to execute jobs that are not necessary for a network security apparatus to become eventually consistent.

DETAILED DESCRIPTION

Figure 1:
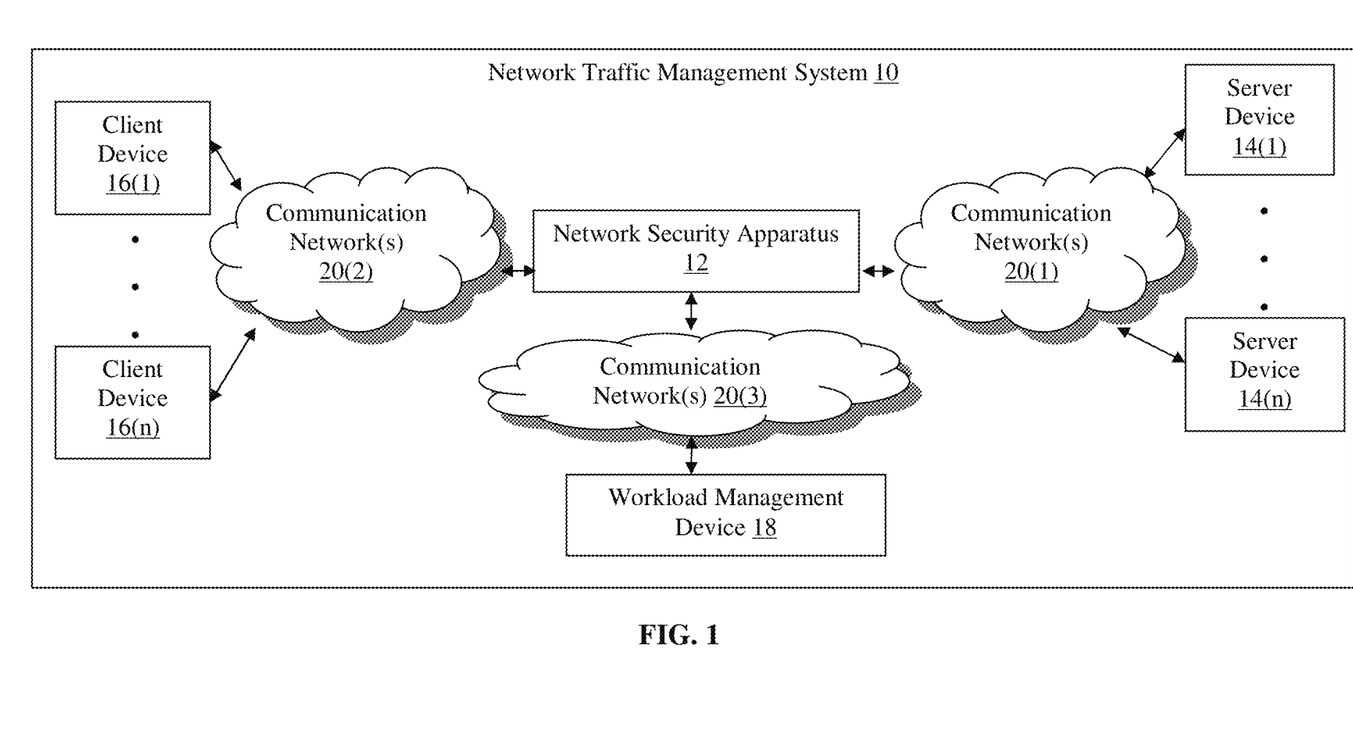
FIG. 1 is a block diagram of an exemplary network traffic management system with a network security apparatus and a workload management device.

Referring to FIG. 1, an exemplary network traffic management system 10 is illustrated. The network traffic management system 10 in this example includes a network security apparatus 12 that is coupled to server devices 14(1)-14($n$), client devices 16(1)-16($n$), and a workload management device 18 via communication network(s) 20(1), 20(2), and 20(3), respectively, although the network security apparatus 12, server devices 14(1)-14($n$), client devices 16(1)-16($n$), and/or workload management device 18 may be coupled together via other topologies. The network traffic management system 10 also may include other network devices such as routers or switches, for example, which are known in the art and thus will not be described herein. This technology provides a number of advantages including methods, non-transitory computer readable media, network traffic management systems, and workload management devices that optimize the processing of workloads associated with received jobs by selectively preempting idempotent jobs to achieve consistent states for objects faster and with reduced overhead.

In this particular example, the network security apparatus 12, server devices 14(1)-14($n$), client devices 16(1)-16($n$), and workload management device 18 are disclosed in FIG. 1 as dedicated hardware devices. However, one or more of the network security apparatus 12, server devices 14(1)-14($n$), client devices 16(1)-16($n$), or workload management device 18 can also be implemented in software within one or more other devices in the network traffic management system 10. For example, the network security apparatus 12 can be hosted by one or more of the server devices 14(1)-14($n$) and/or the workload management device 18 can be hosted by the network security apparatus 12, and other network configurations can also be used.

Figure 2:
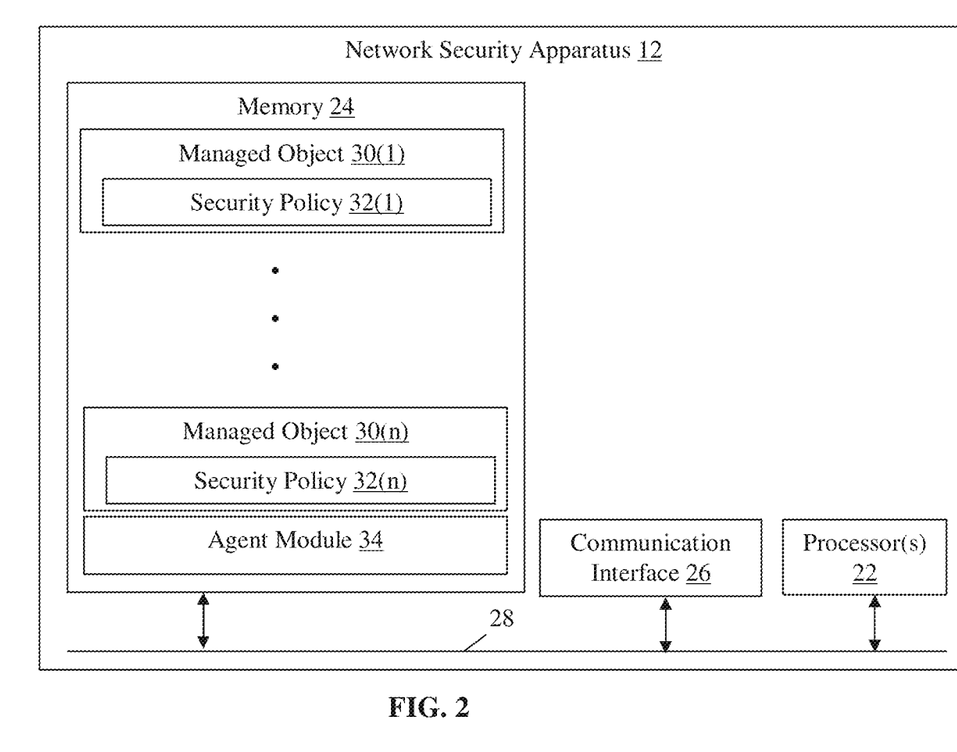
FIG. 2 is a block diagram of an exemplary network security apparatus.

Referring to FIGS. 1-2, the network security apparatus 12 of the network traffic management system 10 may perform any number of functions, including providing network security, load balancing network traffic across the server devices 14(1)-14($n$), proxying connections between the client devices 16(1)-16($n$) and the server devices 14(1)-14($n$), and/or accelerating network traffic associated with applications hosted by the server devices 14(1)-14($n$), for example. The network security apparatus 12 in this example includes processor(s) 22, a memory 24, and a communication interface 26, which are coupled together by a bus 28, although the network security apparatus 12 can include other types or numbers of elements in other configurations.

The processor(s) 22 of the network security apparatus 12 may execute programmed instructions stored in the memory 24 of the network security apparatus 12 for any number of functions described and illustrated herein. The processor(s) 22 of the network security apparatus 12 may include one or more central processing units (CPUs) or general purpose processors with one or more processing cores, for example, although other types of processor(s) can also be used.

The memory 24 of the network security apparatus 12 stores these programmed instructions for aspect(s) of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Figure 4:
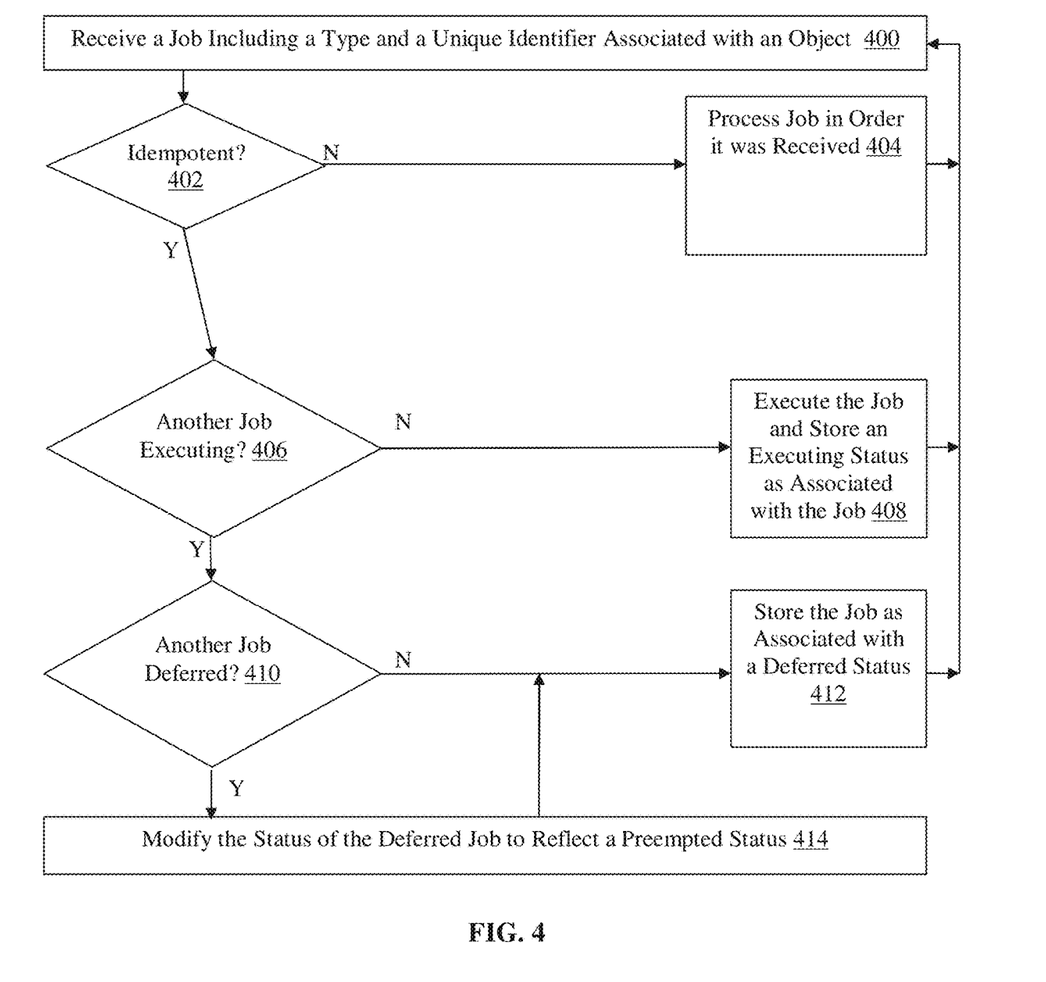
FIG. 4 is a flowchart of an exemplary method for processing incoming jobs to facilitate preemption of idempotent jobs that have been previously deferred.

Accordingly, the memory 24 of the network security apparatus 12 can store module(s) that can include computer executable instructions that, when executed by the network security apparatus 12, cause the network security apparatus 12 to perform actions, such as to transmit, receive, and/or otherwise process network messages, for example, and to perform other actions described and illustrated below with reference to FIGS. 4-6. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the network security apparatus 12 itself, may be located in virtual server(s) running in a cloud-based computing environment rather than being tied to specific physical network computing device(s). Also, the modules may be running in one or more virtual machines (VMs) executing on the network security apparatus. Additionally, in one or more examples of this technology, virtual machine(s) running on the network security apparatus 12 may be managed or supervised by a hypervisor.

In this particular example, the memory 24 of the network security apparatus 12 includes managed objects 30(1)-30($n$), with associated security policies 32(1)-32($n$), and an agent module 34, although the memory 24 can include other policies, modules, databases, and/or applications, for example. The managed objects 30(1)-30($n$) in this example apply the security policies 32(1)-32($n$) to analyze network traffic received from the client devices 16(1)-16($n$), for example, and selectively take action on the network traffic. The managed objects 30(1)-30($n$) are further configured to steer allowed network traffic to appropriate ones of the server devices 14(1)-14($n$) (e.g., to applications hosted by the server devices 14(1)-14($n$)). While the managed objects 30(1)-30($n$) are illustrated in this example, other types and numbers of objects can also be used in other examples.

The agent module 34 in this example is configured to interface with the workload management device 18 and/or administrator device(s) (not shown) to facilitate configuration of the network security apparatus 12 (e.g., of the security policies 32(1)-32(n) maintained thereon). Accordingly, the agent module 34 can expose an application programming interface (API), which is configured to interpret received communications as tasks resulting from a job. For example, a task may be to configure a specific device in a cluster to achieve an intended configured state, although many other types of tasks can also be generated and/or processed by the agent module 34.

The communication interface 26 of the network security apparatus 12 operatively couples and communicates between the network security apparatus 12, server devices 14(1)-14(n), client devices 16(1)-16(n), and, optionally administrator devices (not shown), which are coupled together at least in part by the communication network(s) 20(1)-20(3), although other types and/or another number of communication networks or systems with other types and/or another number of connections and/or configurations to other devices and/or elements can also be used.

By way of example only, one or more of the communication network(s) 20(1)-20(3) can include local area network(s) (LAN(s)) or wide area network(s) (WAN(s)), and can use TCP/IP over Ethernet and industry-standard protocols, although other types or numbers of protocols or communication networks can be used. The communication network(s) 20(1)-20(3) in this example can employ any suitable interface mechanisms and network communication technologies including, for example, Ethernet-based Packet Data Networks (PDNs) and the like.

While the network security apparatus 12 is illustrated in this example as including a single device, the network security apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network security apparatus 12.

Additionally, one or more of the devices that together comprise the network security apparatus 12 in other examples can be standalone devices or integrated with one or more other devices or apparatuses, such as one or more of the server devices 16(1)-16(n), for example. Moreover, one or more of the devices of the network security apparatus 12 in these examples can be in a same or a different communication network including one or more public, private, or cloud networks, for example.

Figure 3:
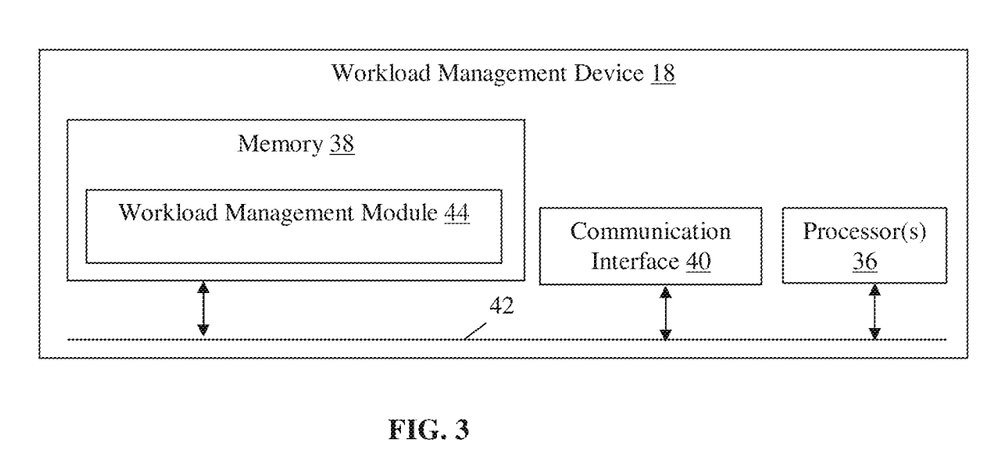
FIG. 3 is a block diagram of an exemplary workload management device.

Referring to FIGS. 1 and 3, the workload management device 18 of the network traffic management system 10 may perform any number of functions, including managing jobs and issuing tasks to the network security apparatus 12, for example. The workload management device 18 in this example includes processor(s) 36, a memory 38, and a communication interface 40, which are coupled together by a bus 42, although the workload management device 18 can include other types or another number of elements in other configurations.

The processor(s) 36 of the workload management device 18 may execute programmed instructions stored in the memory 38 of the workload management device 18 for any number of functions described and illustrated herein. The processor(s) 36 of the workload management device 18 may include one or more CPUs or general purpose processors with one or more processing cores, for example, although other types of processor(s) can also be used.

The memory 38 of the workload management device 18 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s) 36, can be used for the memory 38.

Accordingly, the memory 38 of the workload management device 18 can store one or more modules that can include computer executable instructions that, when executed by the workload management device 18, cause the workload management device 18 to perform actions, such as to transmit, receive, or otherwise process network messages, for example, and to perform other actions described and illustrated below with reference to FIGS. 4-6. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the workload management device 18 itself, may be located in virtual server(s) running in a cloud-based computing environment rather than being tied to one or more specific physical network computing devices. Also, the modules may be running in one or more VMs executing on the workload management device. Additionally, in one or more examples of this technology, virtual machine(s) running on the workload management device 18 may be managed or supervised by a hypervisor.

In this particular example, the memory 38 of the workload management device 18 includes a workload management module 44. The workload management module 44 in this example is configured to facilitate configuration of the security policies 32(1)-32(n) and, optionally, the managed objects 30(1)-30(n) themselves. The workload management module 44 can expose an API to an administrator devise (not shown) that is configured to interpret communications as jobs that have a particular type and globally unique identifier for one of the managed objects 30(1)-30(n). For example, a job may be to add an Internet protocol (IP) address to a blacklist or increment a timer associated with a client connection idle timeout, although many other types of jobs can also be issued and/or generated by the workload management module 44.

The workload management module 44 in this example receives the jobs and manages the execution of the jobs, as described and illustrated in detail below with reference to FIGS. 4-6. The workload management module 44 stores idempotent jobs with status identifiers to facilitate preemption of a subset of the jobs for which a subsequent job of the same type and associated with the same managed object identifier is received. Optionally, the workload management module 44 can include a data structure (e.g., a structured document store) for maintaining the jobs and/or associated job status. By preempting, and never executing, a subset of the received idempotent jobs, the network security apparatus 12 achieves a consistent intended state with reduced overhead and resource utilization, while advantageously increasing job throughput.

The communication interface 40 of the workload management device 18 operatively couples and communicates between the workload management device 18 and the network security apparatus 12, which are coupled together at least in part by the communication network(s) 20(3), although other types or numbers of communication networks and/or systems with other types and/or another number of connections and/or configurations to other devices and/or elements can also be used.

Each of the server devices 16(1)-16(n) of the network traffic management system 10 in this example includes processor(s), a memory, and a communication interface, which are coupled together by a bus or other communication link, although other numbers or types of components could be used. The server devices 16(1)-16(n) in this example can include application servers or database servers, for example, although other types of server devices can also be included in the network traffic management system 10.

In some examples, one or more of the server devices 16(1)-16(n) process login and other requests received from the client devices 14(1)-14(n) via the communication network(s) 20(1)-(2) according to the HTTP-based application RFC protocol, for example. A web application may be operating on one or more of the server devices 16(1)-16(n) and transmitting data (e.g., files or web pages) to the client devices 14(1)-14(n) (e.g., via the network security apparatus 12) in response to requests from the client devices 14(1)-14(n). The server devices 16(1)-16(n) may be hardware or software or may represent a system with multiple servers in a pool, which may include internal or external networks.

Although the server devices 16(1)-16(n) are illustrated as single devices, one or more actions of each of the server devices 16(1)-16(n) may be distributed across one or more distinct network computing devices that together comprise one or more of the server devices 16(1)-16(n). Moreover, the server devices 16(1)-16(n) are not limited to a particular configuration. Thus, the server devices 16(1)-16(n) may contain network computing devices that operate using a master/slave approach, whereby one of the network computing devices of the server devices 16(1)-16(n) operate to manage or otherwise coordinate operations of the other network computing devices. The server devices 16(1)-16(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 16(1)-16(n) can operate within the network security apparatus 12 itself rather than as a stand-alone server device communicating with the network security apparatus 12 via communication network(s) 20(1). In this example, the one or more of the server devices 16(1)-16(n) operate within the memory 24 of the network security apparatus 12.

The client devices 14(1)-14(n) of the network traffic management system 12 in this example include any type of computing device that can exchange network data, such as mobile, desktop, laptop, or tablet computing devices, virtual machines (including cloud-based computers), and the like. Each of the client devices 14(1)-14(n) includes a processor, a memory, and a communication interface, which are coupled together by a bus or other communication link, although other types and/or another number of components could also be used.

The client devices 14(1)-14(n) may run interface applications, such as standard web browsers or standalone client applications. The interface applications may provide an interface to make requests for, and receive content stored on, one or more of the server devices 16(1)-16(n). The client devices 14(1)-14(n) may further include a display device, such as a display screen or touchscreen, or an input device, such as a keyboard for example.

Although the exemplary network traffic management system 10 with the network security apparatus 12, server devices 16(1)-16(n), client devices 14(1)-14(n), workload management device 18, and communication network(s) 20(1)-20(3) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network security apparatus 12, server devices 16(1)-16(n), client devices 14(1)-14(n), or workload management device 18, for example, may be configured to operate as virtual instances on the same physical machine. In other words, one or more of the network security apparatus 12, server devices 16(1)-16(n), client devices 14(1)-14(n), or workload management device 18 may operate on the same physical device rather than as separate devices communicating through communication network(s) 20(1), 20(2), and/or 20(3). Additionally, there may be more or fewer network security apparatuses, client devices, server devices, or workload management devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, PDNs, the Internet, intranets, and combinations thereof.

The examples also may be embodied as one or more non-transitory computer readable media, such as the memory 24 of the network security apparatus 12 and/or the memory 38 of the workload management device 18, having instructions stored thereon for aspect(s) of the present technology, as described and illustrated by way of the examples herein. The instructions in some examples include executable code that, when executed by one or more processors, such as the processor(s) 22 of the network security apparatus 12 and/or the processor(s) 36 of the workload management device 18, cause the processors to carry out steps necessary to implement the methods of the examples of this technology that are described and illustrated herein.

An exemplary method of improved workload processing will now be described with reference to FIGS. 1-6. Referring more specifically to FIG. 4, an example of a method of processing incoming jobs to facilitate preemption of idempotent jobs that have been previously deferred is illustrated. In step 400 in this example, the workload management device 18 of the network traffic management system 10 receives a job that includes a type and a globally unique identifier associated with one of the managed objects 30(1)-

30(n). The job can be received from an administrator device, for example, and can express an intention to establish or modify a configuration of the one of the managed objects 30(1)-30(n) (e.g., via the security policy 32(1)-32(n) applied by the one of the managed objects 30(1)-30(n)). The type can indicate the configuration to be updated, for example, although other types can also be used in other examples.

In one particular example, the job can correspond with workload requiring that a timer associated with a client connection idle timeout for a particular one of the managed objects 30(1)-30(n) is set to a particular value. Accordingly, the type included in the job can reflect the client connection idle timeout configuration. In another example, the job can correspond with a request to change a destination IP address for particular network traffic to be routed or steered by one of the managed objects 30(1)-30(n). In yet another example, the job can be to add an IP address to a whitelist included in one of the security policies 32(1)-32(n). Other types of jobs can also be used in other example.

In step 402, the workload management device 18 determines whether the received job is idempotent. In this example, the workload management device 18 can reference a stored table or other data structure that associates types with an indication of whether the jobs of each of the types is idempotent. Accordingly, the idempotency of a job is determined based on the type included in the received job in this example, although idempotency can be determined in other manners in other examples. Idempotent jobs are those that can be applied multiple times without changing the result (i.e., the state of one of the managed objects 30(1)-30(n)).

With reference to the examples described earlier, a job that requires setting a timer is idempotent in that it does not rely on any previous job that may have modified the timer state and, correspondingly, a subsequent job of the same type for the same one of managed objects 30(1)-30(n) will preempt the job or render the job moot. In contrast, a job that may not be idempotent adds an IP address to a white or black list. In this example, execution of the job in a particular order (e.g., as received) is required for the state of the associated white or black list to be accurate and consistent. If the workload management device 18 determines in step 402 that the job received in step 400 is not idempotent, then the No branch is taken to step 404.

In step 404, the workload management device 18 initiates execution of the job and stores an indication of the job as associated with a status indicating that the job is executing. Accordingly, the workload management device 18 can proceed to update one of the security policies 32(1)-32(n), for example, or make any other configuration change to infrastructure associated with one or more of the managed objects 30(1)-30(n) in order to implement the workload associated with the job.

Subsequent to executing the job in step 404, the workload management device 18 proceeds back to step 400 in this example, although any number of jobs can also be processed by the workload management device 18 in parallel. Referring back to step 402, if the workload management device 18 determines in step 402 that the job received in step 400 is idempotent (e.g., based on the associated type), then the Yes branch is taken to step 406.

In step 406, the workload management device 18 determines whether another job of the same type and associated with the same managed object is currently executing. If the workload management device 18 determines that another job of the same type and associated with the same managed object is not currently executing, then the workload management device 18 proceeds to step 408.

In step 408, the workload management device 18 initiates execution of the job and stores an indication of the job along with a status indicating that the job is currently executing, as described and illustrated in more detail earlier with reference to step 404. Subsequent to executing the job, the workload management device 18 can proceed back to step 400. Referring back to step 406, if the workload management device 18 determines that another job having the same type and associated with the same one of the managed objects 30(1)-30(n) is not currently executing, then the Yes branch is taken to step 410.

In step 410, the workload management device 18 determines whether another job having the same type and associated with the same one of the managed objects 30(1)-30(n) is currently deferred. If another job is executing, but no other job is deferred, then the current job can be deferred in this example in which jobs are not executed concurrently. Accordingly, if the workload management device 18 determines in step 410 that another job having the same type and associated with the same one of the managed objects 30(1)-30(n) is not currently deferred, then the No branch is taken to step 412.

In step 412, the workload management device 18 stores the job received in step 300 as associated with a deferred status. Since there will never be more than one idempotent job deferred in this example, which has the same type and is associated with the same one of the managed objects 30(1)-30(n), queuing is not required and the job can be stored in another type of data structure, such as a structured document store. Subsequent to storing the job, the workload management device 18 proceeds back to step 400 in this example. However, referring back to step 410, if the workload management device 18 determines that another job having the same type and associated with the same one of the managed objects 30(1)-30(n) is currently deferred, then the Yes branch is taken to step 414.

In step 414, the workload management device 18 modifies the status of the deferred job to reflect a preempted status. The status of the deferred job could have been stored as described and illustrated earlier with reference to step 412. Accordingly, if another idempotent job is executing, and yet another idempotent job is deferred, then the deferred job is preempted or rendered moot by the current idempotent job received in step 400. In other words, the deferred job need not be executed and the network security apparatus 12 can conserve resources, and reach a consistent state more quickly, without executing the deferred job.

While the status of the deferred job is modified to reflect that the deferred job is now preempted, the deferred job can be modified or flagged in other ways in other examples, or removed from, or dropped by, the workload management device 18 in yet other examples. Subsequent to modifying the status of the deferred job in step 414, the workload management device 18 proceeds to step 412 in this example and stores the current job as associated with a deferred status. Since the previously-deferred job is now marked as preempted, only the current job is deferred with respect to the particular type of the current job and identified one of the managed objects 30(1)-30(n). In other examples, one or more of steps 400-414 can be performed in parallel for any number of jobs, and/or in a different order than described and illustrated in the example herein.

Figure 5:
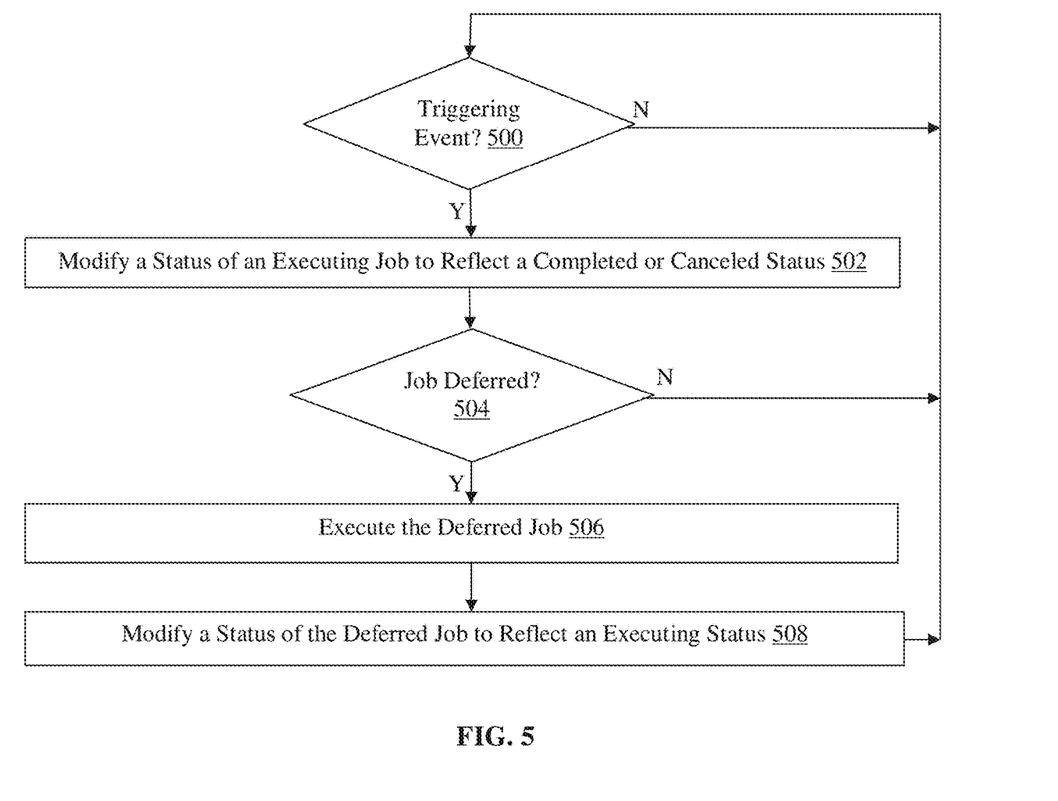
FIG. 5 is a flowchart of an exemplary method for managing job completion and execution of deferred jobs.

Referring more specifically to FIG. 5, an example of a method of managing job completion and execution of deferred jobs is illustrated. In step 500 in this example, the workload management device 18 of the network traffic management system 10 determines whether a triggering event has occurred. In this particular example, the triggering event is the completion of a job, but the triggering event could be the end of a maintenance window, expiration of a time period, or any other type of event in other examples.

The workload management device 18 in this example monitors jobs to determine when they have completed as a background, asynchronous process with respect to the ingestion of jobs described and illustrated earlier with reference to FIG. 4. Accordingly, if the workload management device 18 determines that a triggering event has not occurred, then the No branch is taken back to step 500, and the workload management device 18 effectively waits for a triggering event to occur. However, if the workload management device 18 determines that a triggering event has occurred, then the Yes branch is taken to step 502.

In step 502, the workload management device 18 modifies a status of an executing job to reflect a completed or cancelled status. Optionally, the workload management device 18 can determines whether completion was successful or failed (e.g., because the job timed-out), and can store an indication of the result of the job along with the updated status. In another example, the workload management device 18 can simply remove all information associated with the job from the memory 38 instead of maintaining the job as completed, and other manners for managing job completion can also be used in other examples.

In step 504, the workload management device 18 determines whether there is a stored job, of the same type as the completed job and associated with the same one of the managed objects 30(1)-30(n) as the completed job, which has a deferred status. The job having a status indicating that the job is deferred could have been stored as described and illustrated in more detail earlier with reference to step 412 of FIG. 4, for example, with respect to idempotent jobs.

If the workload management device 18 determines in step 504 that a deferred job of the same type and associated with the same one of the managed objects 30(1)-30(n) as the completed job is not stored, then the No branch is taken back to step 500. However, if the workload management device 18 determines in step 504 that there is a stored job, of the same type as the completed job and associated with the same one of the managed objects 30(1)-30(n) as the completed job, which has a deferred status, then the Yes branch is taken to step 506.

In step 506, the workload management device 18 initiates execution of the deferred job. The deferred job in this example can be the job, of the same type associated with the same one of the managed objects 30(1)-30(n) as the completed job, which was least-recently received. However, if the completed and deferred jobs have a type indicating that the jobs are idempotent, then there is necessarily only one stored job to retrieve for execution, which is of the same type, has an identifier associated with the same one of the managed objects 30(1)-30(n), and has a deferred status.

In step 508, the workload management device 18 updates the stored status for the job for which execution was initiated in step 506 from deferred to executing. Subsequent to modifying the status, the workload management device 18 proceeds back to step 500 in this example. In other examples, one or more of steps 500-508 can be performed in a different order and/or in parallel for any number of triggering events.

Figure 6:
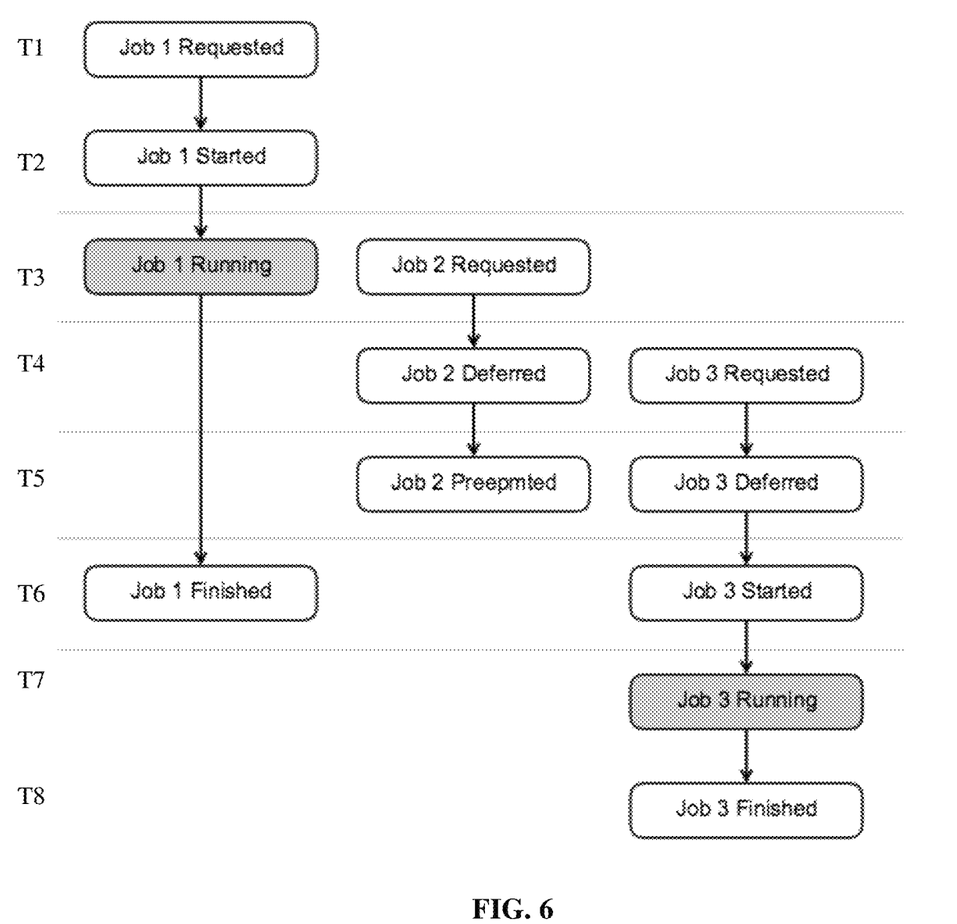
FIG. 6 is a flow diagram of an exemplary method for handling idempotent jobs.

Referring more specifically to FIG. 6, a flow diagram of a method of handling exemplary idempotent jobs is illustrated. In this example, idempotent job 1 is generated by the workload management device at a time T1. The workload management device 18 starts execution of job 1 at a time T2. At a time T3, the workload management device 18 modifies a status associated with the job 1 to indicate that job 1 is executing. Additionally, at time T3, job 2 is generated by the workload management device 18. Job 2 in this example is of the same type as job 1, and is therefore also idempotent, and is associated with a same one of the managed objects 30(1)-30(n) as job 1 based on a shared identifier for the one of the managed objects 30(1)-30(n) included in job 1 and job 2.

At a time T4, the workload management device 18 determines that since job 1 is executing, job 2 should be deferred in this example in which jobs of the same type for the same one of the managed objects 30(1)-30(n) are not executed concurrently. Accordingly, job 2 is stored as associated with a deferred status. Also at time T4, job 3 is requested (e.g., by an administrator device) and received by the workload management device 18. Job 3 in this example is of the same type as jobs 1 and 2, and is therefore also idempotent, and is associated with a same one of the managed objects 30(1)-30(n) as jobs 1 and 2 based on a shared identifier for the one of the managed objects 30(1)-30(n) included in jobs 1, 2, and 3.

At time T5, the workload management device 18 determines that stored job 2 is deferred, and therefore is preempted by job 3. Accordingly, the workload management device 18 modifies the status associated with job 2 to reflect a preempted status, or removes job 2 from the memory 38, and stores job 3 with a status indicating that job 3 is currently deferred. At time T6, the workload management device 18 determines that job 1 has finished, and modifies the stored status associated with job 1 to indicate that job 1 has completed.

Since job 1 has completed, workload management device 18 in this example retrieves, and initiates execution of, job 3, which is of the same type, and is associated with the same one of the managed objects 30(1)-30(n), as job 1. Job 2 is not executed because it has an associated status indicating that it is preempted. At time T7, the workload management device 18 modifies a status associated with the job 3 to indicate that job 3 is currently executing. At time T8, the workload management device 18 determines that job 3 has finished, and modifies the stored status associated with job 3 to indicate that job 3 has completed.

With this technology, network security apparatuses, and other systems that process jobs at a slower rate than the jobs are generated, can advantageously reduce overhead and increase reliability. In particular, idempotent jobs are filtered, stored as deferred jobs when a job of the same type is executing for a same object, and selectively preempted when subsequent jobs of the same type and associated with the same object are received. Accordingly, resources are advantageously not utilized to execute jobs that are not necessary for a network security apparatus to become eventually consistent.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for workload processing implemented by a network traffic management system comprising one or more network security apparatuses, workload management devices, server devices, or client devices, the method comprising:
   identifying when a status associated with one of a plurality of jobs indicates that the one of the plurality of jobs is deferred, wherein the one of the plurality of jobs comprises a type corresponding with an idempotent workload;
   determining when the one of the plurality of jobs is preempted based on the type, when the identification indicates that the one of the plurality of jobs is deferred and the type and an identifier of the one of the plurality of jobs matches another one of the plurality of jobs; and
   adjusting another status of the another one of the plurality of jobs to indicate that the another one of the plurality of jobs is deferred, and modifying the status of the one of the plurality of jobs to indicate the one of the plurality of jobs is preempted or removing the one of the plurality of jobs, when the determination indicates that the one of the plurality of jobs is preempted.

2. The method of claim 1, further comprising, when an additional one of the plurality of jobs having the type and the identifier is determined to have completed:
   modifying an additional status to indicate that the additional one of the plurality of jobs has completed or removing the additional one of the plurality of jobs;
   executing the another one of the plurality of jobs; and
   modifying the another status to indicate that the another one of the plurality of jobs is executing.

3. The method of claim 1, wherein the idempotent workload is associated with a managed object and comprises a configuration update for a network security policy.

4. The method of claim 3, wherein the managed object is configured to analyze network traffic received from clients according to the network security policy and send the network traffic via one or more communication networks to an application hosted by one or more servers.

5. The method of claim 1, further comprising:
   determining when deferral of the one of the plurality of jobs is required, when an additional one of the plurality jobs having the type and the identifier is executing; and
   storing the one of the plurality of jobs as associated with the status, when the determination indicates that the deferral of the one of the plurality of jobs is required.

6. A workload management device, comprising memory comprising programmed instructions stored thereon and one or more processors configured to be capable of executing the stored programmed instructions to:
   identify when a status indicates one of a plurality of jobs is deferred;
   determine when the one of the jobs is preempted based on a type of the one of the jobs, when the identification indicates the one of the jobs is deferred and the type and an identifier of the one of the jobs matches another one of the jobs; and
   adjust another status of the another one of the jobs to indicate that the another one of the plurality of jobs is deferred, and modify the status of the one of the one of the plurality of jobs to indicate the one of the plurality of jobs is preempted or remove the one of the plurality of the jobs, when the determination indicates the one of the plurality of the jobs is preempted.

7. The workload management device of claim 6, wherein the one or more processors are further configured to be capable of executing the stored programmed instructions to, when an additional one of the plurality of jobs having the type and the identifier is determined to have completed:
   modify an additional status to indicate that the additional one of the plurality of jobs has completed or removing the additional one of the plurality of jobs;
   execute the another one of the plurality of jobs; and
   modify the another status to indicate that the another one of the plurality of jobs is executing.

8. The workload management device of claim 6, wherein an idempotent workload is associated with a managed object and comprises a configuration update for a network security policy.

9. The workload management device of claim 8, wherein the managed object is configured to analyze network traffic received from clients according to the network security policy and send the network traffic via one or more communication networks to an application hosted by one or more servers.

10. The workload management device of claim 6, wherein the one or more processors are further configured to be capable of executing the stored programmed instructions to:
    determine when deferral of the one of the plurality of jobs is required, when an additional one of the plurality jobs having the type and the identifier is executing; and
    store the one of the plurality of jobs as associated with the status, when the determination indicates that the deferral of the one of the plurality of jobs is required.

11. A non-transitory computer readable medium having stored thereon instructions for workload processing comprising executable code that, when executed by one or more processors, causes the one or more processors to:
    identify when a status associated with one of a plurality of jobs indicates that the one of the plurality of jobs is deferred, wherein the one of the plurality of jobs comprises a type corresponding with an idempotent workload;
    determine when the one of the plurality of jobs is preempted based on the type, when the identification indicates that the one of the plurality of jobs is deferred and the type and an identifier of the one of the plurality of jobs matches another one of the plurality of jobs; and
    adjust another status of the another one of the plurality of the jobs to indicate that the another one of the plurality of jobs is deferred, and modify the status of the one of the plurality of the jobs to indicate the one of the plurality of jobs is preempted or remove the one of the plurality of jobs, when the determination indicates that the one of the plurality of jobs is preempted.

12. The non-transitory computer readable medium of claim 11, wherein the executable code, when executed by the one or more processors further causes the one or more processors to, when an additional one of the plurality of jobs having the type and the identifier is determined to have completed:
    modify an additional status to indicate that the additional one of the plurality of jobs has completed or removing the additional one of the plurality of jobs;
    execute the another one of the plurality of jobs; and
    modify the another status to indicate that the another one of the plurality of jobs is executing.

13. The non-transitory computer readable medium of claim 11, wherein the idempotent workload is associated with a managed object and comprises a configuration update for a network security policy.

14. The non-transitory computer readable medium of claim 13, wherein the managed object is configured to analyze network traffic received from clients according to the network security policy and send the network traffic via one or more communication networks to an application hosted by one or more servers.

15. The non-transitory computer readable medium of claim 11, wherein the executable code, when executed by the one or more processors further causes the one or more processors to:
    determine when deferral of the one of the plurality of jobs is required, when an additional one of the plurality jobs having the type and the identifier is executing; and
    store the one of the plurality of jobs as associated with the status, when the determination indicates that the deferral of the one of the plurality of jobs is required.

16. A network traffic management system, comprising one or more workload management devices, network security apparatuses, server devices, or client devices with memory comprising programmed instructions stored thereon and one or more processors configured to be capable of executing the stored programmed instructions to:
    identify when a status associated with one of a plurality of jobs indicates that the one of the plurality of jobs is deferred, wherein the one of the plurality of jobs comprises a type corresponding with an idempotent workload;
    determine when the one of the plurality of jobs is preempted based on the type, when the identification indicates that the one of the plurality of jobs is deferred and the type and an identifier of the one of the plurality of jobs matches another one of the plurality of jobs; and
    adjust another status of the another one of the plurality of the jobs to indicate that the another one of the plurality of jobs is deferred, and modify the status of the one of the plurality of the jobs to indicate the one of the plurality of jobs is preempted or remove the one of the plurality of jobs, when the determination indicates that the one of the plurality of jobs is preempted.

17. The network traffic management system of claim 16, wherein the one or more processors are further configured to be capable of executing the stored programmed instructions to, when an additional one of the plurality of jobs having the type and the identifier is determined to have completed:
    modify an additional status to indicate that the additional one of the plurality of jobs has completed or removing the additional one of the plurality of jobs;
    execute the another one of the plurality of jobs; and
    modify the another status to indicate that the another one of the plurality of jobs is executing.

18. The network traffic management system of claim 16, wherein the idempotent workload is associated with a managed object and comprises a configuration update for a network security policy.

19. The network traffic management system of claim 18, wherein the managed object is configured to analyze network traffic received from clients according to the network security policy and send the network traffic via one or more communication networks to an application hosted by one or more servers.

20. The network traffic management system of claim 16, wherein the one or more processors are further configured to be capable of executing the stored programmed instructions to:
    determine when deferral of the one of the plurality of jobs is required, when an additional one of the plurality jobs having the type and the identifier is executing; and
    store the one of the plurality of jobs as associated with the status, when the determination indicates that the deferral of the one of the plurality of jobs is required.

* * * * *